Oct. 18, 1966            J. BELL            3,279,263

GYROSCOPIC CONTROL APPARATUS

Filed July 17, 1964

United States Patent Office 3,279,263
Patented Oct. 18, 1966

3,279,263
GYROSCOPIC CONTROL APPARATUS
John Bell, Beckenham, Kent, England, assignor to Muirhead & Co., Limited, Kent, England, a British company
Filed July 17, 1964, Ser. No. 383,286
Claims priority, application Great Britain, June 19, 1964, 25,576/64
3 Claims. (Cl. 74—5.6)

This invention relates to control means for ship stabilizers and, particularly, to ship stabilizers of the water-tank kind or stablizers using moving solid masses whether of the activated or free surface (passive) types. In these types of stabilizer it has been found that a control signal related to the angular acceleration of the ship's rolling motion provides optimum stabilizing torque in the stabilizing means. To produce such a control signal a velocity sensitive or rate gyroscope acts through a differential lever system in known manner to produce a movement or mechanical signal which is sensibly the first time derivative of the velocity signal, i.e., an acceleration signal, which is applied by any convenient means to control the pumping means, the weight moving means or the water control means as required. Due, however, to the inertia of the parts, friction and other causes, the acceleration signal will not be truly displaced by 90° from the velocity signal. Furthermore, lags will also occur in the power means operating in accordance with the control signal.

The invention consists in a control apparatus for ships stabilizers comprising a velocity sensitive gyroscope for producing a mechanical signal proportional to roll velocity, means operated from the gyroscope for producing a mechanical signal therefrom which is proportional to roll acceleration and means operated from the gyroscope and from said means for subtracting at least a portion of the original velocity signal from the derived acceleration signal to give a further signal, the phase of which is in advance of the acceleration signal.

The invention will be further described with reference to the drawings in which.

Figure 1:
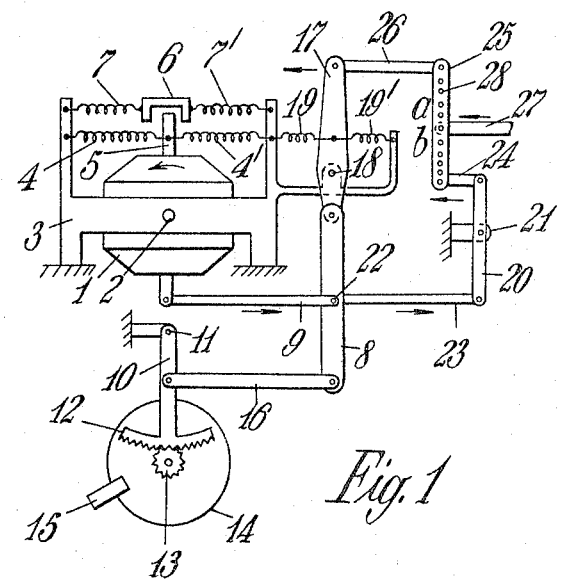
FIGURE 1 is a schematic plan view of an embodiment of the invention.

In FIGURE 1 a rate gyroscope is mounted in casing 1 with its spin axis in a horizontal plane and oriented athwartships. The case 1 is allowed one degree of motion about vertical axis 2 in rigid structure 3. Under static conditions, i.e. when the ship is not rolling, springs 4 and 4' which are of light tension maintain the casing 1 in a centralized position, as shown. When the ship commences to roll the gyroscope will precess in known manner about axis 2 causing deflection of springs 4 and 4' which deflection is proportional to the rate or angular velocity of rolling. Because springs 4 and 4' are of light tension, the gyroscope will be sensitive to vary small angular velocities. When, however, the roll velocity exceeds a certain amount, peg 5 to which springs 4 and 4' are attached will engage one or other of the inner faces of U-piece 6 and thus bring into action a further pair of control springs 7 and 7' of greater tension. It will be appreciated that this process may be extended by a third set of springs to provide for still higher velocities.

The precessional motion of gyroscope casing 1 is transmitted to an articulated differential lever system, specifically it is transmitted via an output member or extension of peg 5 over link means 9 to an intermediate point 22 on a floating lever 8. Arm 10, pivoted at 11, carries at its free end a quadrant gear 12 which meshes with pinion 13. Pinion 13 drives a metal disc 14 of high electrical conductivity the peripheral surface of which passes between the poles of a U-shaped permanent magnet 15.

This arrangement will be recognized as an eddy-current brake, the braking force of which is proportional to the speed of rotation of disc 14.

A link 16 is pivoted at one to an intermediate point on arm 10 and, at the other end, to one extremity of floating lever 8. Lever 17 is pivoted at 18 and the shorter arm is pivotally connected to the other extremity of floating lever 8. Springs 19 and 19' centralize lever 17 when the apparatus is in the quiescent condition.

Under dynamic conditions, i.e., when the gyroscope senses angular velocity, the movement of lever 17, which in effect constitutes an acceleration output member, acting against centralizing springs 19 and 19' and the restraint of the aforesaid braking means over lever 8 and link 16, is proportional in known manner to the rate of change of velocity, i.e. acceleration.

So far a known manner has been described of deriving, by mechanical means, an acceleration signal from a velocity signal. The novelty of the invention resides in the additional articulated subtracting lever system now to be described which, co-operating with those already described, produces a final output signal which is advanced in phase over the acceleration signal. Lever 20, pivoted at point 21, is pivotably connected at one end with the aforesaid intermediate point 22 on floating lever 8 via link 23 so that, as can be seen from the geometry of the system, lever 20 rocks in accordance with the velocity signal. The other end of lever 20 is pivotably connected via link 24 to one extremity of floating lever 25, the other extremity of which is pivotably connected via link 26 to the extremity of the long arm of lever 17.

Thus, it will be seen with reference to the arrows that when, for example, the gryscope casing 1 precesses in an anti-clockwise direction, due to an angular velocity, the upper end of floating lever 25 will move to the left by an amount proportional to acceleration while the lower end will also move to the left by an amount proportional to velocity, and, consequently, the movement of the output arm 27, which is pivoted to an intermediate point on floating lever 25 will be in advance of the acceleration by an amount dependent upon the magnitude of the velocity signal and the ratio of the lever portions $a$ and $b$. Various pivot points 28 are provided along the floating lever 25 to which the output arm 27 may be attached, thus making it possible to vary the ratio of the two portions $a$ and $b$. The output arm may, for example, activate the sensitive valve of a hydraulic relay (not shown) which, in turn, will control in a proportional manner the main stabilizer actuating means.

Figure 2:
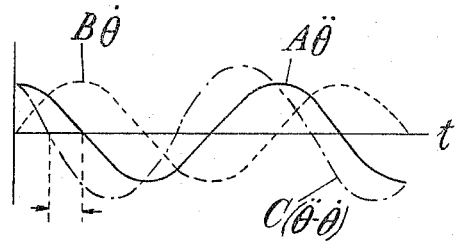
FIGURE 2 shows graphically the development of the control signal.

The various components of the rolling motion described above (assuming these to be sinusoidal) are graphically represented in FIGURE 2 in which curve A represents acceleration, curve B represents velocity and curve C is the result of subtracting curve B from curve A and represents the signal produced by arm 27. It will be seen that for curves A and B of equal amplitude, as in the example, the phase advance of curve C on curve A is 45°. The symbols $\dot{\theta}$ and $\ddot{\theta}$ are the first and second differential coefficients with respect to time of an angular displacement.

Various modifications may be made according to the invention.

I claim:

1. A control apparatus for ship stabilization comprising a velocity sensitive rate gyroscope, an output member connected to said gyroscope and movable therewith for producing a mechanical signal proportional to roll velocity; an articulated differential lever system including means connected to said output member and an acceleration output member for producing a mechanical signal proportional to roll acceleration; an articulated substracting lever system connected to said means and said acceleration output member for mechanically substracting at least a portion of the original roll velocity signal from the derived acceleration signal to give an output mechanical signal, the phase of which is in advance of the said acceleration signal.

2. A control apparatus as claimed in claim 1 in which the articulated substracting lever system includes a lever articulated at either end and an output arm selectively connectable to various intermediate points on said lever to vary the proportions in which the said roll velocity signal and said derived acceleration signal are combined.

3. A control apparatus as claimed in claim 1, and including a set of light tension control springs for small angular velocities and a set of control springs of greater tension for higher angular velocities and both sets being operatively associated with said first mentioned output member.

References Cited by the Examiner

UNITED STATES PATENTS

| | | | |
|---|---|---|---|
| 2,046,735 | 7/1936 | Frisch et al. | 74—5.7 |
| 2,290,232 | 7/1942 | Fischer | 74—5.4 X |
| 2,299,117 | 10/1942 | Von Manteuffel | 74—5.6 |
| 2,345,169 | 3/1944 | Wunsch | 74—5.6 |
| 2,709,921 | 6/1955 | Sylvan | 74—5.4 X |

FRED C. MATTERN, Jr., *Primary Examiner.*

BROUGHTON G. DURHAM, *Examiner.*

T. W. SHEAR, P. W. SULLIVAN, *Assistant Examiners.*